(12) United States Patent
Lothe (10) Patent No.: US 8,500,995 B2
(45) Date of Patent: Aug. 6, 2013

(54) METHOD AND DEVICE FOR TREATMENT OF WATER

(75) Inventor: Per Lothe, Forresfjorden (NO)

(73) Assignee: Knutsen Ballastvann AS, Haugesund (NO)

( * ) Notice: Subject to any disclaimer, the term of this patent is extended or adjusted under 35 U.S.C. 154(b) by 0 days.

(21) Appl. No.: 13/578,999

(22) PCT Filed: Feb. 21, 2011

(86) PCT No.: PCT/NO2011/000064
§ 371 (c)(1),
(2), (4) Date: Oct. 2, 2012

(87) PCT Pub. No.: WO2011/105911
PCT Pub. Date: Sep. 1, 2011

(65) Prior Publication Data
US 2013/0015140 A1 Jan. 17, 2013

(30) Foreign Application Priority Data

| Feb. 24, 2010 | (NO) | ................................. 20100275 |
| Jan. 31, 2011 | (NO) | ................................. 20110160 |
| Jan. 31, 2011 | (NO) | ................................. 20110163 |
| Feb. 9, 2011 | (NO) | ................................. 20110228 |
| Feb. 9, 2011 | (NO) | ................................. 20110229 |

(51) Int. Cl.
*B01D 33/70* (2006.01)
(52) U.S. Cl.
USPC ........... 210/150; 210/151; 210/804; 210/808; 210/180; 210/188; 210/241; 210/748.11

(58) Field of Classification Search
USPC ................. 210/804, 808, 150–151, 180, 188, 210/241, 748.11
See application file for complete search history.

(56) References Cited

U.S. PATENT DOCUMENTS

| 4,659,347 | A | 4/1987 | Schrems |
| 4,990,260 | A | 2/1991 | Pisani |
| 6,200,486 | B1 | 3/2001 | Chahine et al. |
| 6,221,260 | B1 | 4/2001 | Chahine et al. |
| 2007/0068860 | A1* | 3/2007 | Lothe ............................ 210/188 |
| 2009/0071910 | A1* | 3/2009 | Ike et al. ....................... 210/748 |

FOREIGN PATENT DOCUMENTS

| WO | 2005/009907 A1 | 2/2005 |
| WO | 2007/117634 A2 | 10/2007 |
| WO | 2009022913 A1 | 2/2009 |

OTHER PUBLICATIONS

International Search Report for parent application PCT/NO2011/000064, having a mailing date of May 2, 2011.
Written Opinion for parent application PCT/NO2011/000064, having a mailing date of May 2, 2011.

* cited by examiner

*Primary Examiner* — Chester Barry
(74) *Attorney, Agent, or Firm* — Andrus, Sceales, Starke & Sawall, LLP (57) ABSTRACT

A method is for the treatment of ballast water, in which the ballast water is carried into a ballast tank via a down pipe and in which an underpressure created at the upper portion of the down pipe induces the formation of gas bubbles in the ballast water. Before flowing into the down pipe, the ballast water is carried via a throttling device into a closed container at the upper portion of the down pipe, the closed container having a flow area larger than the flow area of the down pipe.

26 Claims, 6 Drawing Sheets

METHOD AND DEVICE FOR TREATMENT OF WATER

CROSS-REFERENCE TO RELATED APPLICATIONS

This application is the U.S. national stage application of International Application No. PCT/NO2011/000064, filed Feb. 21, 2011, which International application was published on Sep. 1, 2011 as International Publication No. WO 2011/105911 A1 in the English language and which application is incorporated herein by reference. The International application claims priority of Norwegian Patent Application No. 20100275, filed Feb. 24, 2010, Norwegian Patent Application No. 20110163, filed Jan. 31, 2011, Norwegian Patent Application No. 20110160, filed Jan. 31, 2011, Norwegian Patent Application No. 20110229, filed Feb. 9, 2011, and Norwegian Patent Application No. 20110228, filed Feb. 9, 2011, which applications are incorporated herein by reference.

This invention relates to a method for the treatment of water. More particularly, it relates to a method for the treatment of water, typically ballast water, in which the ballast water is carried into a ballast tank via a down pipe, and in which an underpressure which is created at the upper portion of the down pipe induces the formation of gas bubbles in the ballast water. The invention also includes a device for practicing the invention.

to For ship-technical reasons, when a ship is sailing, there must be some cargo in the ship. As known, non-income-generating cargo is called ballast.

Sea water is widely used as ballast because of the relatively easy loading and unloading of the sea water. However, a great is many species of organisms are carried in the ballast water from the place where it is loaded to the place of unloading.

A great part of the living organisms die during the transport and more die when they are released at the place of unloading. However, under favourable conditions, a procreative stock may survive. Introducing foreign organisms into a new place has been known to have catastrophic consequences to the fisheries in entire sea areas, among other things.

New directives for the treatment of ballast water with a view to rendering organisms harmless are being drawn up in international bodies. The directives emphasize that the treatment of the ballast water must be safe, it must be environmentally acceptable, it must be reasonable in use and it must work.

It is known to expose the ballast water to an underpressure to destroy larger living organisms, for example crawfish. It is known to treat ballast water with chemicals to destroy also bacteria and viruses.

Some of the chemicals that are used are suspected of having an adverse effect on the environment at the unloading site.

WO document 2009/022913 discloses a method of treating ballast water, the ballast water being carried through a down pipe to produce underpressure and gas bubbles in the ballast water.

WO document 2005/009907 deals with the treatment of ballast water in a down pipe in order to reduce the oxygen content of the ballast water, among other things.

Ultraviolet radiation, so-called UV radiation, of water is well known for rendering pathogenic organisms in drinking water harmless, among other things. It is also known to use UV radiation to destroy non-pathogenic organisms from, for example, ballast water, injection water and from water for other purposes in which these organisms are undesirable alive.

UV radiation is carried out by means of so-called UV aggregates in which the water is carried through a relatively strong field of UV light. The effect of UV light on organisms is cumulative and dependent on, inter alia, the intensity of the UV lamp, the distance of the organism from the UV lamp, the prevailing temperature and also the time during which the organism stays in the UV light. The flow rate of the water through the UV aggregate is often relatively low to give the water and thereby the organisms sufficient dwell time in the UV light for the organisms to be destroyed.

When a major stream of water is to be treated, such as drinking water in densely populated areas or ballast water on board vessels, there is a need for UV aggregates of considerable sizes, thereby also having great energy consumption.

Chemicals are dosed into liquids to achieve a desired effect. Various properties of the chemicals, for example their being expensive or harmful to the surroundings, make it desirable to keep the consumption of the relevant chemical at a lowest possible level.

Treating water to render organisms that are in the water harmless is well known and used in a number of fields. For example, it is usual to add for example chlorine to drinking water to render pathogenic organisms harmless. It is also known to use chemicals such as chlorine, often in the form of chlorine dioxide $ClO_2$, to destroy non-pathogenic organisms, for example from ballast water, injection water and other places in which these organisms are undesirable alive.

To achieve a reliable effect, such chemical are usually added in amounts of 3-4 ppm. This may lead to a relatively large consumption of the relevant chemical or chemicals which, are normally discharged into nature after use, which is environmentally worrying.

Separation of lipids and hydrocarbons from water other than ballast water is carried out in a number of situations. It may be in operations as diverse as treating produced water from a petroleum well or separating lipids from process water in dairies, commercial kitchens or abattoirs.

The prior art includes various techniques such as flotation, centrifugation, membrane techniques or the use of a cyclone. Different forms of coalescing droplets in the water to gather drops where the drops would not otherwise be able to rise to the surface are also used.

Common to many of the known methods that are used is that in water that is discharged from the process there are still some residual lipids or residual hydrocarbons. It may be relatively expensive to remove these smaller residues to obtain a purity which is acceptable according to public requirements.

SUMMARY

The invention has for its object to remedy or reduce at least one of the drawbacks of the prior art.

The object is achieved in accordance with the invention through the features which are specified in the description below and in the claims that follow.

A method of treating water, typically ballast water, has been provided, in which the ballast water is carried into a ballast tank via a down pipe, and in which an underpressure created at the upper portion of the down pipe induces the formation of gas bubbles in the ballast water. The method is characterized by the ballast water being carried, before entering the down pipe, via a throttling device into a closed container at the upper portion of the down pipe, the closed container having a larger flow cross section than the flow cross section of the down pipe.

By an appropriate choice of inlet pressure, throttling area, container flow cross section, down pipe flow cross section and length of down pipe a considerable pressure drop may be achieved across the throttling while, at the same time, the ballast water in the container is boiling. Such a pressure drop and the subsequent dwell time in the container are sufficient to destroy a great many species belonging to the group of eukaryotic organisms.

It is necessary to maintain a boiling state in the container, or at least in the upper portion of the container. If there is not such a boiling state, gases, including air, separated from the ballast water will take up an increasing volume in the container and in the down pipe, whereby the underpressure in the container and in the upper portion of the down pipe is reduced considerably.

From open-channel hydraulic theory, the so-called Froude number is known. The Froude number F which is dimensionless is defined as a ratio between the inertial force and the gravitational force acting on a fluid:

$$F = \frac{V}{\sqrt{gh_m}}$$

in which V=the fluid velocity in metres per second, g=the earth gravitation in metres per second$^2$ and $h_m$=the hydraulic mean depth.

By replacing the hydraulic depth $h_m$ in the formula with the diameter D of a pipe, an expression is found that has turned out to be appropriate for the selection of suitable pipe diameters $$F_d = \frac{V}{\sqrt{gD}}$$

During the development work it has turned out that the Froude number of the container must be less than 0.2 whereas the Froude number of the down pipe must be greater than 0.3. The vertical height of the down pipe should exceed 10 metres to achieve a sufficient boiling effect in the container with ballast water at a normal sea temperature.

The outlet from the down pipe should be free as flow restrictions could increase the pressure in the container.

The best function is achieved when the Froude number in the container is less than 0.1, whereas the Froude number in the down pipe is 0.8-1.7.

The method for treating ballast water may further include:
forming a through opening in a separating body, the opening being divergent in the direction of flow;
increasing the pressure in the ballast water; and
passing the ballast water through the opening, a smallest dimension of opening being less than 1.5 mm.

The opening is formed divergent in order to avoid, to the greatest degree possible, a pressure increase downstream in the opening after the water has flowed through the smallest opening dimension of the opening. By an appropriate choice of pressure drop and opening dimension, trials have shown that a considerable part of organisms in the ballast water are destroyed during the flow through the opening. A larger pressure drop and smaller opening dimension give a higher destruction percentage. The opening may be constituted by, for example, a relatively elongated slot, or an opening of a random cross section. In purely practical terms, it has turned out that a slot with a smallest opening dimension of between 0.75 and 1 mm by a pressure drop of at least three bars gives a good result.

The method may further include covering the opening with a cover which is provided with a through-going cover opening.

It has turned out that a larger proportion of the organisms die as they collide with the cover at relatively great speed.

The method may further include reducing the pressure downstream of the opening below the ambient pressure. The pressure may be reduced until the water boils at the prevailing temperature, typically the water temperature.

By at least part of the water being in vapour form downstream of the separating body, the outflowing water from the opening may flow relatively freely towards the cover and further to the downstream side of the cover.

The method may further include surrounding the separating body with a tight container with an outlet, the container having a Froude number which is less than 0.3 and preferably less than 0.2.

It is thereby easier to maintain an underpressure downstream of the opening while at the same time a Froude number as mentioned above contributes to preventing air liberated from the water from not accumulating in the container but being entrained by the water flow out of the container.

The method may include a method of improving the effect of UV radiation in water, the water flowing in a water stream through a treatment plant and the method being characterized by including:
exposing the water to an underpressure which brings the water to boil at the prevailing water temperature;
exposing the water to UV radiation while the water is at least partially in vapour form.

Surprisingly, it has been found that the effect of the UV radiation on organisms in water is substantially improved by exposing the organisms to the radiation while they are in a fluid comprising water with a substantial proportion of gas in the form of vapour and other gases, if any. The fluid may have a larger volumetric proportion of vapour and gas than of liquid.

This points in the opposite direction of that of the established knowledge in the field, in which it is claimed that the effect of UV radiation is reduced when there are bubbles in the water, and in which it is therefore sought to avoid the formation of bubbles in the water prior to the UV treatment.

By gases liberated from the water are meant gases that are liberated from the water as the pressure is lowered, for example air.

Trials have shown that the UV-light intensity may be reduced to less than 50% and in some cases down towards 70% of the normal dose and still maintain the initial effect.

The method may further include exposing the water to underpressure in a container and letting the water be exposed to UV radiation at least in the container or downstream of the container.

Such a method is relatively easy and reasonable to arrange. It may be appropriate to throttle the water flow before the water is exposed to underpressure in the container. This facilitates adjustment of the desired underpressure in the container.

The method may include improving the effect of chemicals on living organisms in water, the water flowing in a stream through a treatment plant, the method including:
supplying a chemical into the water;
exposing the water to an underpressure which brings the water to boil at the prevailing water temperature;

letting the chemical work on organisms that are in the water in a fluid including the water, including gases liberated from the water.

The fluid may have a larger volumetric proportion of gas than of liquid.

It has surprisingly turned out that the effect of the chemical on organisms in water is substantially improved by exposing the organisms to the chemical while they are in a fluid including water with a substantial proportion of gas in the form of vapour and other gases, if any.

Trials have shown that the proportion of chlorine oxide added may be reduced from the usual level of 3-4 ppm down to 0.5-1 ppm and still maintain the initial effect.

The method may further include exposing the water to an underpressure in a container while the chemical is being added to the water or after the chemical has been added to the water.

Such a method is relatively simple and reasonable to arrange. It may be appropriate to throttle the water flow before the water is exposed to underpressure in the container. This facilitates adjustment of the desired underpressure in the container.

The method may include the separation of at least lipids or hydrocarbons from water, the water flowing in a stream through a treatment plant, and the method including:
 exposing the water to an underpressure which brings the water to boil at the prevailing water temperature;
 letting at least the lipids or the hydrocarbons separate from the water in a fluid which includes at least the lipids or the hydrocarbons and the water, including gases liberated from the water; and
 letting at least the lipids or the hydrocarbons float to the surface of the water subsequent to a pressure increase.

The fluid may have a larger volumetric proportion of gas than of liquid.

It has surprisingly been found that lipids and hydrocarbons that are boiling during said treatment are dissolved only to an insignificant degree in the water subsequent to the water being at a higher pressure again, typically the ambient pressure. Lipids and hydrocarbons thereby rise to the water surface, from which they may be skimmed in a manner known per se.

The method may further include exposing the water to an underpressure in a container. Such a method is relatively simple and reasonable to arrange. It may be appropriate to throttle the water flow before the water is exposed to underpressure in the container. This facilitates the adjustment of the desired underpressure in the container.

The method according to the invention may be practised by means of a down pipe for water, typically ballast water into a ballast tank, in which underpressure in the down pipe induces the formation of gas bubbles in the ballast water, and which is characterized by an inlet pipe communicating with a closed container via a throttling device, the container being connected to the upper portion of the down pipe, the closed container having a flow cross section larger than the flow cross section of the down pipe.

As mentioned above, the Froude number of the container should be less than 0.2 and the Froude number of the down pipe should be greater than 0.3.

The throttling device may be constituted by a throttling valve to facilitate the setting of the throttle cross section relative to the flow rate.

It has turned out to be appropriate to arrange a vortex breaker at the outlet of the container in order better to be able to maintain the underpressure in the container.

to The container may be provided with a lamp which produces ultraviolet light (UV lamps) to destroy smaller organisms. The UV-light source may be on or in the container, possibly arranged in a closed vessel at the container.

The container or the down pipe may be provided with a supply for a chemical, for example in the form of chlorine dioxide or hypochlorite.

It has turned out that the effect of UV light and chemicals is increased substantially when the treatment takes place in a container in accordance with the invention.

As mentioned above, the down pipe in which the underpressure is created is formed with sufficient height, for example above the deck of a vessel, typically in the order of 10 metres, to achieve a sufficient underpressure in the seawater at the upper portion of the down pipe.

An absolute pressure of down towards 0.01 bars may be achieved at the upper portion of the down pipe. The living organisms are thereby exposed to a decimated pressure drop from the atmospheric pressure. Experience shows that some larger organisms do survive such a pressure drop, and a greater pressure drop may be appropriate.

The down pipe may be fed ballast water under a higher pressure. By choosing an absolute pressure upstream of the throttling of, for example, two bars, at least a 100-fold pressure drop is achieved, whereas this is doubled if an absolute inlet pressure is chosen to be four bars. Such elevated pressure drops will contribute to ensuring that larger living organisms, such a crawfish and molluscs for example, are destroyed when they suddenly undergo this treatment.

The device may include a separating body which is provided with at least one opening which is divergent in the direction of flow, and in which the smallest opening dimension of the opening is less than 1.5 mm.

The separating body which separates upstream pressurized water from downstream water may be constituted by, for example, a pipe. The separating body may be built from sections and be formed with reinforcing ribs. Normally, the separating body is formed with many openings.

The opening angle of the divergent openings is larger than 45 degrees. Depending on the water temperature and pressure, opening angles of between 45 and 120 degrees have turned out to work satisfactorily. A relatively small opening angle makes it possible to arrange several openings within a given area of the separating body. An angle of between 70 and 110 degrees seems to be the most practical with respect to effect and possible opening area in the separating body.

The openings may be covered by a cover which is provided with a through-going cover opening. The cover may be arranged downstream just outside the separating body. The smallest opening dimension of the cover opening is between 0.5 and 1.5 times the smallest opening dimension of the opening but should preferably be adapted in such a way that the total flow area of the cover is larger than that of the separating body.

The separating body with the openings may be enclosed by a tight container with an outlet, which, together with a connected down pipe downstream, enables relatively easy establishment and maintenance of underpressure in the container. The diameter of the container must be sufficiently large for the fluid flow out of the openings not to be obstructed by, for example, water and vapour not flowing away. The container may be standing or lying.

During the development work it has turned out that the Froude number of the container should be less than 0.3 whereas the Froude number of the down pipe should be greater than 0.3. The vertical height of the down pipe should exceed 10 metres to achieve a sufficient boiling effect in the container with ballast water at a normal sea temperature. The length of the down pipe should not be too large either, as a length of over 12.5 m has turned out, in some cases, to contribute to an undesired flow pattern in the container.

The outlet of the down pipe should be relatively free as flow restrictions in connection with the outlet may increase the pressure in the container. Both the container and a receiver at the lower portion of the down pipe have larger diameters than the down pipe.

The best function is achieved when the Froude number in the container is between 0.1 and 0.2 because separated air is then drawn out of the container while, at the same time, a desired boiling effect is maintained. The Froude number in the down pipe should be between 0.8-1.7 to provide the best possible capacity.

The flow area available in the separating body may be adjusted, for example by means of a so-called slide valve.

The pressure upstream of the separating body may be increased until an appropriate effect occurs. The pressure drop necessary depends on the smallest opening dimension of the opening. Trials show that a pressure drop of 3 bars or more across the openings having a smallest opening dimension of 0.8 mm is necessary to achieve an acceptable effect.

By arranging a, relative to the opening, downstream absolute pressure of down towards 0.01 bars, the living organisms will be exposed to a decimated pressure drop from the atmospheric pressure. When the upstream pressure is increased to two bars, for example, at least a 100-fold pressure drop is achieved, which is doubled if the absolute inlet pressure is chosen to be four bars.

The device may include equipment for improving the effect of UV radiation in water, in which the water flows through a treatment plant, and in which the water is carried into a container where it is exposed to an underpressure which brings the water to boil at the prevailing water temperature, and in which, at least in or downstream of the container, the plant is provided with an UV plant.

The underpressure in the container may be provided by means of a pump connected downstream.

The device may include equipment for improving the effect of chemicals on living organisms in water, in which water flows through a treatment plant, the treatment plant being characterized by the water being carried into a container where the water is exposed to an underpressure which brings the water to boil at the prevailing water temperature.

The inlet pipe or the container may be provided with a supply for a chemical, for example in the form of chlorine dioxide, hypochlorite, ozone or metal ions.

The device may include equipment for separating at least lipids or hydrocarbons from water, in which the water flows through a treatment plant, and in which the water is carried into a container in which the water is exposed to an underpressure which brings the water to boil at the prevailing water temperature.

For an improved effect of UV radiation and effect of chemicals on living organisms and also separation of lipids or hydrocarbons from water, it holds true that the underpressure in the container may be provided by means of a pump connected downstream.

Alternatively, the underpressure may be provided by means of a down pipe connected downstream relative to the container. If a down pipe is used, it is important that the Froude number of the container, see below, is less than 0.3 and that the Froude number of the down pipe is greater than 0.3.

The inlet of the container may be provided with a throttling device for the adjustment of the flow rate and thereby the underpressure in the container. The throttling device may include, for example, a slide valve, a disc valve or some other suitable throttling or regulating device.

It is necessary to maintain a boiling state in the container, or at least in a portion of the container. If such a boiling state does not exist, gases, including air separated from the water, will take up an increasing volume in the container and in the down pipe, whereby the underpressure in the container and in the upper portion of the down pipe may be substantially reduced.

The same condition as mentioned above under the discussion of the separating body applies with respect to the Froude number and the throttling device.

The method and the device according to the invention provide a relatively simple and cost-effective solution for the treatment of ballast water. Larger organisms are rendered harmless by the underpressure in the down pipe, whereas smaller organisms, such as bacteria and viruses, are destroyed by means of UV light or by means of chemicals known per se for the purpose.

The method is well suited for treating water and also for other purposes.

BRIEF DESCRIPTION OF THE DRAWINGS

In what follows is described an example of a preferred method and embodiment which is visualized in the accompanying drawings, in which FIG. 1 shows a container and a down pipe in accordance with the invention;

FIG. 2 shows, on a larger scale, a section I-I of FIG. 1;

FIG. 3 shows a section II-II of FIG. 2;

FIG. 4 shows the container in an alternative embodiment;

FIG. 5 shows, on a larger sale, a section IV-IV of FIG. 4;

FIG. 6 shows, on a still larger scale, a section of FIG. 5;

FIG. 7 shows, in a section corresponding to I-I of FIG. 1, a container which is provided with UV lamps;

FIG. 8 shows a section VII-VII of FIG. 7;

FIG. 9 shows, in a section corresponding to I-I of FIG. 1, an embodiment in which the UV lamps are in a UV plant; and FIG. 10 shows an embodiment in which the container is arranged horizontally.

DETAILED DESCRIPTION OF THE DRAWING

In the drawings the reference numeral 1 indicates a down pipe of a length "L" and flow area "b", the down pipe 1 opening at its lower end portion into a tank 2 which communicates with the ballast tank of a vessel not shown. At its upper end portion the down pipe 1 is connected to a tight container 4 which has a flow area "B", "B" being larger than "b", see FIG. 3.

A vortex breaker 6 is arranged at the outlet 8 of the container 4.

An inlet pipe 10, which communicates with a ballast pump not shown, has its outlet opening 12 at the upper portion of the container 4. In this exemplary embodiment the outlet opening 12 is provided with a throttling device 14 in the form of a disc valve, the valve disc 16 of the throttling device 14 covering the outlet opening 12 in an axially displaceable manner. An adjustable annular gap 18 is thereby formed at the outlet opening 12.

On its side facing the inlet pipe 10, the valve disc 16 may be given a non-planar shape, for example concave, convex, or be formed with pump impeller blades, not shown.

The valve disc 16 is connected to a rod 20 which extends through a stuffing box 22, the rod 20 being provided with threads 24 at its upper end portion. A nut 26 which fits on the threads 24 bears on the stuffing box 22 and is used to adjust the annular gap 18.

The inlet pipe 10 is provided with an opening 28 for a possible supply of chemicals.

As ballast water is supplied under pressure in the inlet pipe 10, the container 4 and the down pipe 1 fill with ballast water. The length L of the down pipe 1 has the effect of n making an underpressure establish in the container 4 when the down pipe 1 is filled with water.

The underpressure is adjusted to the prevailing ballast water temperature and the ballast water in the container 4 is brought to boil without any further energy being supplied.

If the Froude numbers of the flow areas "b" and "B" are chosen to be outside the values mentioned above, gases will relatively quickly separate from the water, the gases taking up a substantial part of the volume of the container 4 and the upper portion of the down pipe 1.

However, if the Froude numbers mentioned are within the specified values, the gases separated are continuously entrained by the ballast water and underpressure and a state of boiling are maintained. The vortex breaker 6 contributes favourably to this effect.

By the very fact of the underpressure being maintained in the container 4, the throttling device 14 may be set at a desired pressure drop. The pressure drop across the throttling device 14 further contributes to turbulent multiphase flow in the container 4 while at the same time living organisms are destroyed because of the pressure drop across the throttling device 14 and the subsequent underpressure.

Figure 1:
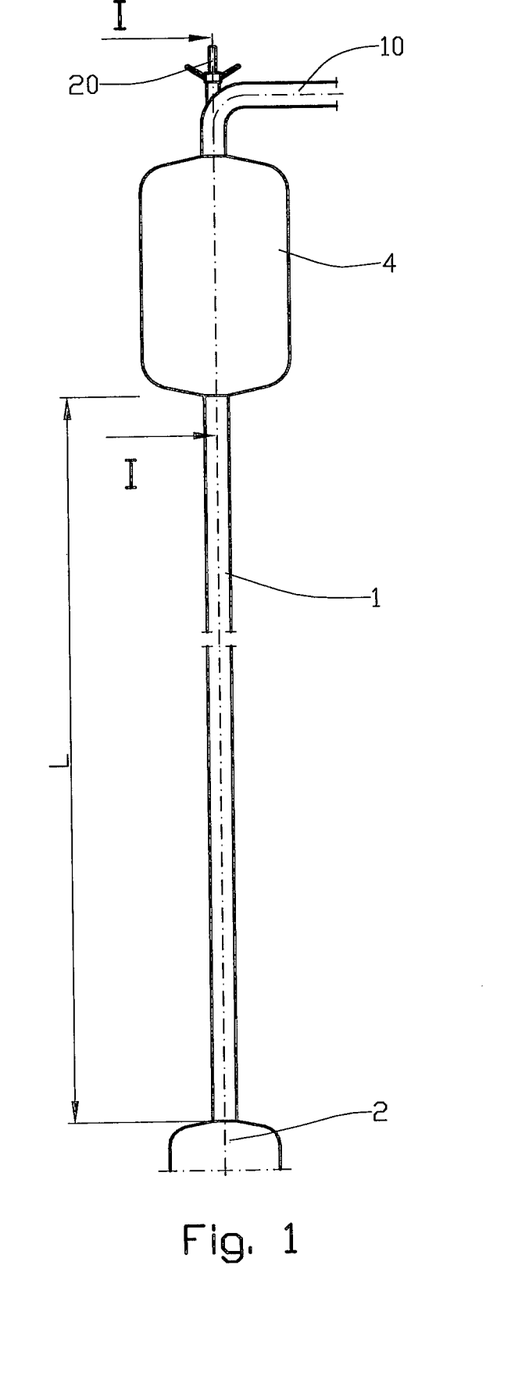
Figure 2:
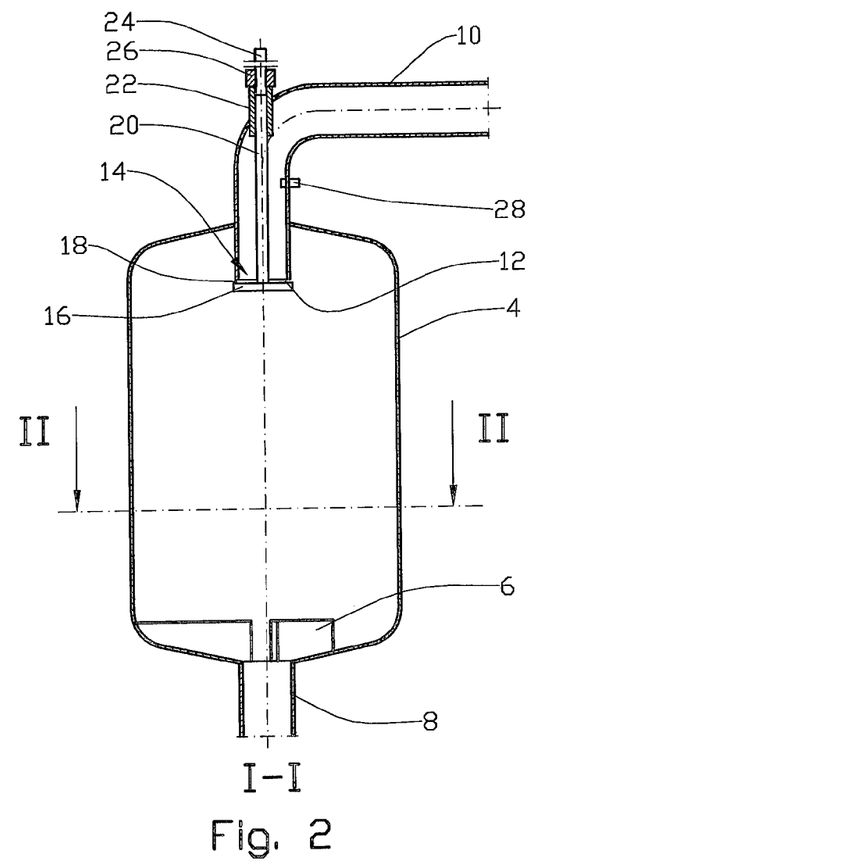
Figure 3:
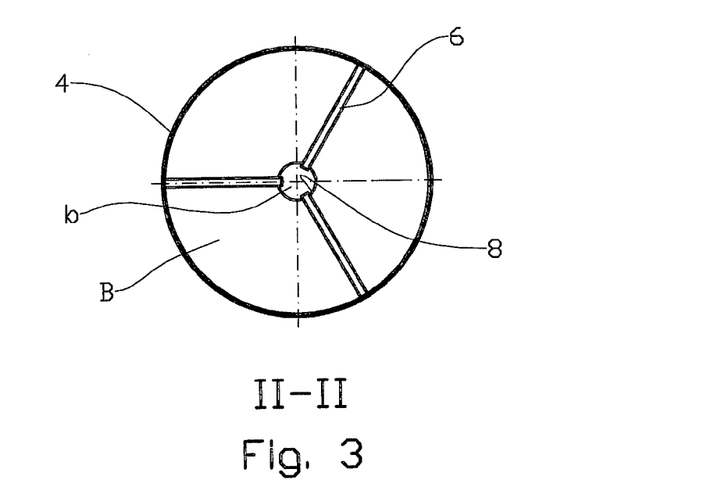
Figure 4:
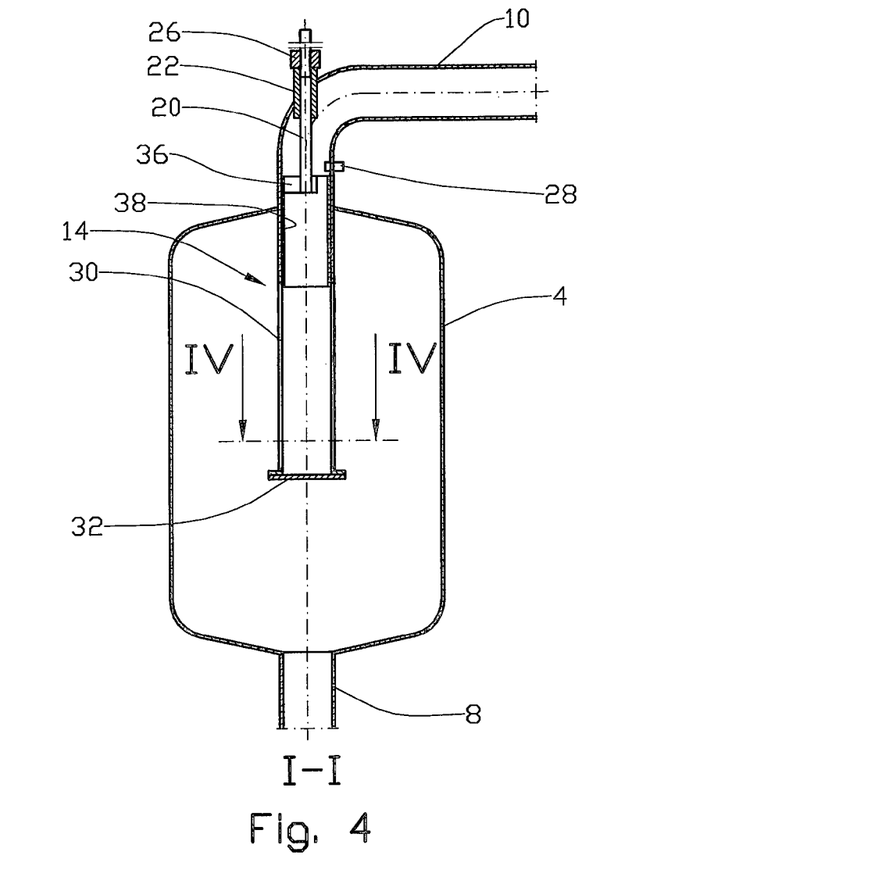

In an alternative embodiment, the inlet pipe 10 is connected to a throttling device 14 in the form of a separating body 30. The separating body 30 which is sealed by means of a flange 32, projects into the container 2, see FIG. 4, and is provided with a number of openings 34 divergent in the direction of flow. The openings 34 have a smallest opening dimension "s" and an opening angle "α", see FIGS. 5 and 6. The shape of the opening 34 at the smallest opening dimension "s" is a knife shape and relatively sharp.

In this exemplary embodiment the openings 24 are formed by relatively elongated slots in the separating body 30.

By means of the rod 20, a slide valve 36 in the form of a pipe body 38 is arranged to be moved in the separating body 8 to adjust the flow area of the separating body 8. The use of other methods of adjustment, for example by means of an actuator not shown, is often appropriate.

Figure 5:
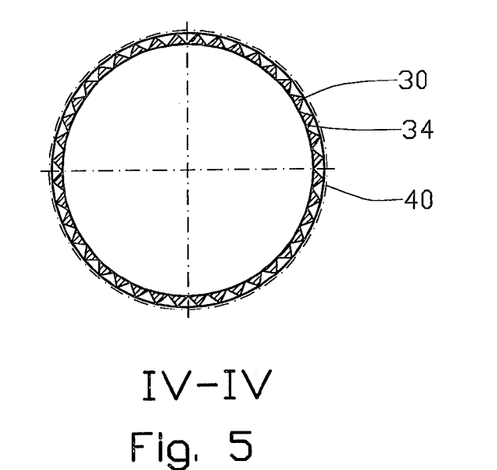
Figure 6:
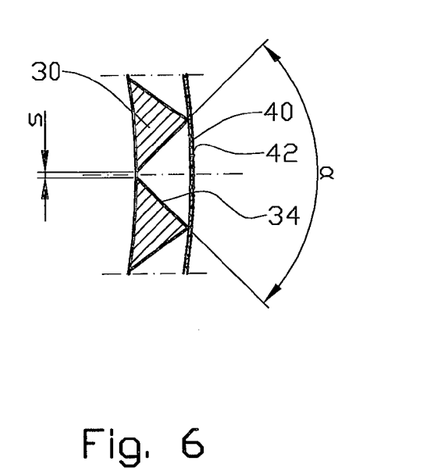

A cover 40 with cover openings 42 is arranged downstream, close to the separating body 30, see FIGS. 5 and 6. The cover 40 may be constituted by, for example, a cloth, netting, a perforated plate or some other suitable component.

When ballast water is to be treated, the ballast water flows in under pressure through the inlet pipe 10 and further into the separating body 30. The water continues under falling pressure through the openings 34, after which the ballast water at relatively great velocity hits the cover 40 and flows through the cover openings 42. As the down pipe 1 fills with ballast water, an underpressure establishes in the container 2, causing the ballast water to boil at the prevailing temperature.

The ballast water flowing out of the openings 34 is thereby retarded to a substantially smaller extent than when the container 2 is filled with water, which increases the intended effect of the flow through the openings 34 and the impact against the cover 40 to a substantial extent.

The slide valve 36 is then adjusted until there is the desired pressure drop across the separating body 30.

Figure 7:
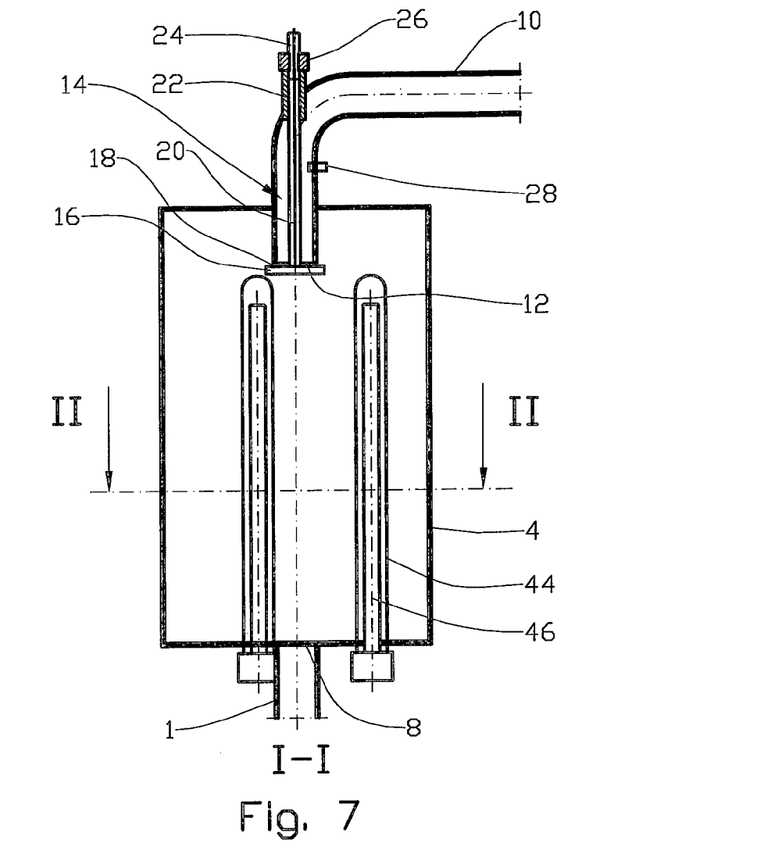
Figure 8:
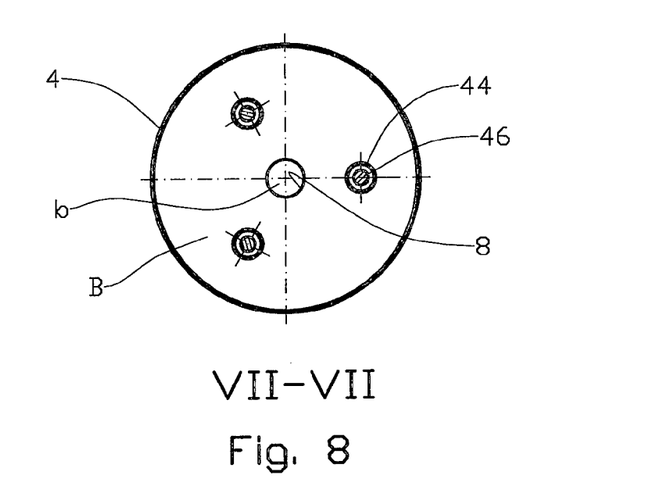

In one embodiment, see FIGS. 7 and 8, the container 2 is provided with three tight, transparent pipes 44 which are open towards the outside of the container 2. There are UV lamps 46 placed in the pipes 44.

Figure 9:
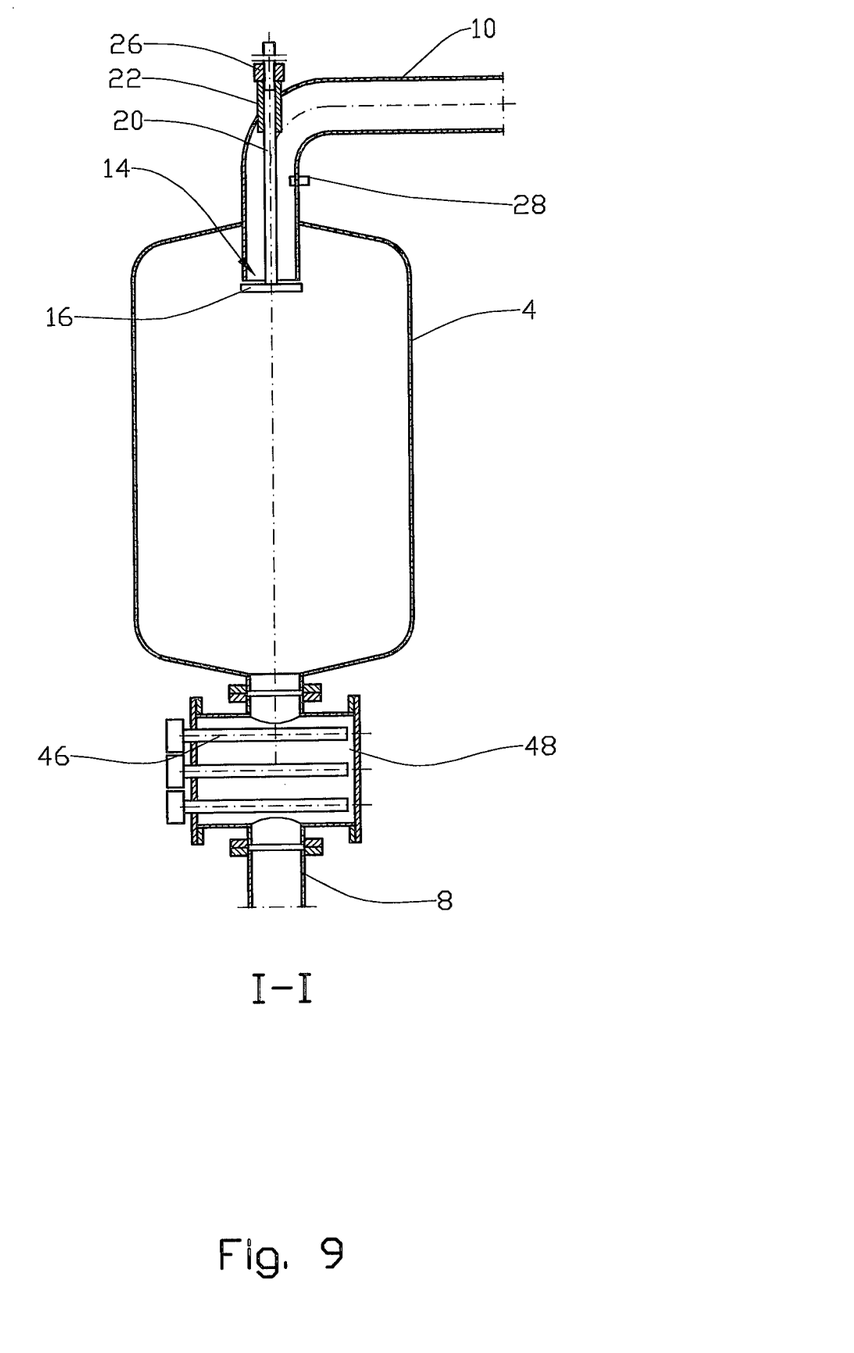

Alternatively, the UV lamps 46 may be arranged in a UV plant 48, known per se, which is arranged in the outlet 8 of the container 2, see FIG. 9.

The fluid flowing through the UV plant 48 thereby includes water having a considerable proportion of vapour and gas bubbles, whereby the effect of the UV light on organisms in the water is increased to a substantial extent.

The considerable proportion of vapour and gas bubbles present in the water has the effect of making the effect of the chemicals in the water increase to a substantial extent.

Chemicals may be added to the water through the opening 28, for example.

The underpressure in the water flowing through the container 2 and including water having a considerable proportion of vapour and gas bubbles brings lipids and hydrocarbons present in the water to boil, often before the water boils.

Figure 10:
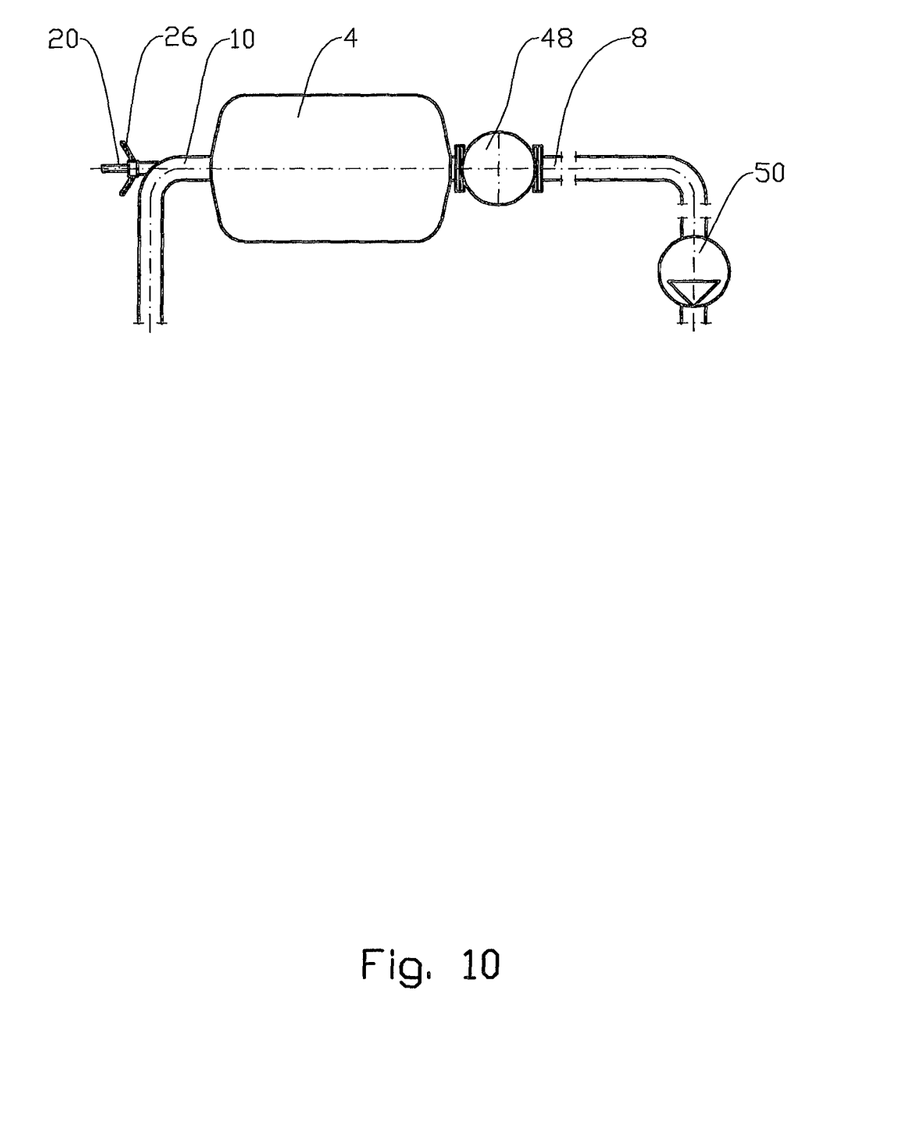

FIG. 10 shows the device with the container 2 lying, the device and method in accordance with the invention functioning just as well with the container 2 in this position. FIG. 10 shows that a pump 50 may be connected to the outlet 8 to contribute to the formation of sufficient underpressure in the container 2. The pump 50 is normally arranged at a certain distance from the container 2 and at a somewhat lower height level to be able to reduce the risk of cavitation in the pump 50.

The invention claimed is:

1. A method for the treatment of ballast water, the method comprising:
    carrying the ballast water into a ballast tank via a down pipe so that an underpressure which is formed at the upper portion of the down pipe induces formation of gas bubbles in the ballast water, and
    before entering the down pipe, carrying the ballast water via a throttling device into a closed container at the upper portion of the down pipe, the closed container having a larger flow area than the flow area of the down pipe.

2. The method in accordance with claim 1, wherein the container is formed with a Froude number which is less than 0.2.

3. The method in accordance with claim 1, wherein the down pipe is formed with a Froude number which is greater than 0.6.

4. The method in accordance with claim 1, wherein the method comprises:
    forming a through opening in a separating body, the opening being divergent in the direction of flow;
    increasing the pressure in the ballast water; and
    passing the ballast water through the opening in which a smallest opening dimension(s) is less than 1.5 mm.

5. The method in accordance with claim 4, wherein the method further comprises covering the opening with a cover which is provided with a through-going cover opening.

6. The method in accordance with claim 4, wherein the method further comprises reducing the pressure downstream of the opening below the ambient pressure.

7. The method in accordance with claim 4, wherein the method further comprises reducing the pressure downstream of the opening until the water boils at the prevailing temperature.

8. The method in accordance with claim 4, wherein the method further comprises enclosing the separating body with the opening with a tight container with an outlet, the container having a Froude number less than 0.3.

9. The method in accordance with claim 1 for improving the effect of UV radiation in water, the water flowing in a water stream through a treatment plant, wherein the method comprises:
exposing the water to an underpressure which brings the water to boil at the prevailing water temperature; and
exposing the water to UV radiation while the water is at least partially in vapour form.

10. The method in accordance with claim 9, wherein the method further comprises exposing the water to underpressure in a container and letting the water be exposed to UV radiation at least in the container or downstream of the container.

11. The method in accordance with claim 1 for improving the effect of chemicals on living organisms in water, the water flowing in a stream through a treatment plant, wherein the method comprises:
supplying a chemical into the water;
exposing the water to an underpressure which brings the water to boil at the prevailing water temperature; and
letting the chemical work on organisms that are in the water in a fluid including the water, including gases liberated from the water.

12. The method in accordance with claim 1 for separating at least lipids or hydrocarbons from water, the water flowing in a stream through a treatment plant, wherein the method comprises:
exposing the water to an underpressure which brings the water to boil at the prevailing water temperature;
letting at least the lipids or the hydrocarbons separate from the water in a fluid including at least the lipids or hydrocarbons and the water, including gases liberated from the water; and
letting at least the lipids or the hydrocarbons float to the surface of the water subsequent to a pressure increase.

13. A down pipe for ballast water to a ballast tank, in which underpressure in the down pipe induces the formation of gas bubbles in the ballast water, wherein via a throttling device, an inlet pipe communicates with a closed container which is connected to the upper portion of the down pipe, the closed container having a flow area larger than the flow area of the down pipe.

14. The down pipe in accordance with claim 13, wherein the Froude number of the container is less than 0.1.

15. The down pipe in accordance with claim 13, wherein the Froude number of the down pipe is greater than 0.3.

16. The down pipe in accordance with claim 13, wherein the throttling device is constituted by a throttling valve.

17. The down pipe in accordance with claim 13, wherein the outlet of the container is provided with a vortex breaker.

18. The down pipe in accordance with claim 13, in which ballast water is flowing to a separating body before being carried to a ballast tank, wherein the separating body is provided with openings divergent in the direction of flow, the smallest opening dimension(s) being less than 1.5 mm.

19. The down pipe in accordance with claim 18, wherein the opening angle ($\alpha$) of the divergent openings is larger than 45 degrees.

20. The down pipe in accordance with claim 18, wherein the opening is covered by a cover which is provided with a through-going cover opening.

21. The down pipe in accordance with claim 20, wherein the smallest opening dimension of the cover opening is between 0.5 and 1.5 times the smallest opening dimension(s) of the opening.

22. The down pipe in accordance with claim 13 for improving the effect of UV radiation in water, the water flowing through a treatment plant, wherein the water is carried into a container in which it is exposed to an underpressure which brings the water to boil at the prevailing water temperature, and the treatment plant is provided with a UV plant at least in or downstream of the container.

23. The down pipe in accordance with claim 13 for improving the effect of chemicals on living organisms in water, the water flowing through a treatment plant, wherein the water is carried into a container in which the water is exposed to an underpressure which brings the water to boil at the prevailing water temperature.

24. The down pipe in accordance with claim 13, wherein the container is provided with a supply for a chemical.

25. The down pipe in accordance with claim 13 for separating at least lipids or hydrocarbons from water, the water flowing through a treatment plant, wherein the water is carried into a container in which the water is exposed to an underpressure which brings the water to boil at the prevailing water temperature.

26. The down pipe in accordance with claim 22, wherein downstream, the container is connected to a pump.

* * * * *